United States Patent [19]

Sisson et al.

[11] Patent Number: 5,505,352
[45] Date of Patent: Apr. 9, 1996

[54] CYCLE PANNIER

[75] Inventors: David M. Sisson; Gregory J. Murphy, both of Santa Barbara, Calif.

[73] Assignee: Jandd Mountaineering, Inc., Santa Barbara, Calif.

[21] Appl. No.: 444,153

[22] Filed: May 18, 1995

Related U.S. Application Data

[63] Continuation of Ser. No. 308,398, Sep. 19, 1994, abandoned, which is a continuation of Ser. No. 81,574, Jun. 23, 1993, abandoned.

[51] Int. Cl.$^6$ .................................. B62J 7/04; B62J 9/00
[52] U.S. Cl. ........................... 224/32 A; 224/30 R
[58] Field of Search .................. 224/30 R, 42, 224/572, 32 R, 32 A, 39, 210

[56] References Cited

U.S. PATENT DOCUMENTS

| 3,903,944 | 9/1975 | Montgomery et al. | 224/32 A X |
|---|---|---|---|
| 3,937,374 | 2/1976 | Hine | 224/32 A |
| 3,955,727 | 5/1976 | Montgomery | 224/32 A X |
| 4,174,895 | 11/1979 | Jackson et al. | 224/32 A |
| 4,418,850 | 12/1983 | Jackson et al. | 224/32 A |
| 4,487,344 | 12/1984 | Blackburn | 224/32 A |
| 4,491,258 | 1/1985 | Jones | 224/210 X |
| 4,516,705 | 5/1985 | Jackson | 224/32 A |
| 4,662,548 | 5/1987 | Jackson et al. | 224/32 A |
| 4,671,438 | 6/1987 | La Plante | 224/32 A |

FOREIGN PATENT DOCUMENTS

| 231632 | 7/1944 | Switzerland | 224/32 A |
|---|---|---|---|
| 2180737 | 4/1987 | United Kingdom | 224/32 A |

*Primary Examiner*—Henry J. Recla
*Assistant Examiner*—Charles R. Eloshway
*Attorney, Agent, or Firm*—Lyon & Lyon

[57] ABSTRACT

A pannier for cycles includes J-shaped top mounting hooks and a bottom hook. The bottom hook is attached to a "V" shaped webbing, which is rotatably attached to the pannier, preferably at two locations. A webbing track with optional positioning devices may be tightened internal to the pannier. A movable, securely attached pannier is provided.

13 Claims, 3 Drawing Sheets

CYCLE PANNIER

This is a continuation of application Ser. No. 08/308,398, filed on Sep. 19, 1995 now abandoned, which is a continuation of application Ser. No. 08/081,574, filed on Jun. 23, 1993, also abandoned.

FIELD OF THE INVENTION

This invention relates generally to saddle type bags or panniers. More particularly, it relates to adjustable panniers for use on bicycles.

BACKGROUND

The ever growing popularity of cycling both on roads and off, for pleasure and commuting, has brought about a large demand for ways to carry various items while riding a bicycle. The best method to carry a medium to large sized load on a bicycle is through the use of pannier (saddle type bags) mounted to rear and/or front racks. With the variations in bicycle geometry and the growth of off road riding there arise two major obstacles in mounting the bag securely to the bicycle rack; adjustability so that it can be made to fit a broad spectrum of bicycles while not interfering with the operation of the bicycle, and a positive lock on system to allow the user to travel in any type of terrain.

The adjustment problem of fitting various sizes of bicycles can be solved easily with the addition of fore and aft movement of the bag. The problem is that this is not easily accomplished in a light weight and easy to use package. All panniers are attached at the top of the rack with some hook mechanism usually metal or plastic, generally in an inverted "J" shape. Multiple mounting holes make for adaptability to various rack types but to move the entire bag one must readjust the bottom mounting hook. This is inconvenient for the cyclist. Further, most prior art panniers do not provide for moving the bottom hook. Those that have permitted movement, used a metal backplate, and were not very versatile.

The mechanism attaching the bottom hook to the bag is also very important. In the prior art, panniers relied on a simple bungee cord and hook mechanism to secure the bag. The problem with the bungee system is that as the bag bounces the bungee stretches and the pannier can easily become detached from the rack, usually ending up in the spokes of the bicycle.

Despite these long existing problems, no satisfactory solution has been advanced previously.

SUMMARY OF THE INVENTION

The invention of a hook retained by a webbing track via friction type buckles allows for adjustment of the pannier. Moving the hook forward shifts the bag back away from the rider allowing for a custom fit to a wide range of bicycles. To secure the webbing track tightly to the pannier, both to lock the sliding mechanism in place and prevent the bag from bouncing away from the bicycle, the webbing track is continued on the inside of the bag with the ends being connected by another type of lockable friction buckle allowing it to be cinched down very tightly.

The "V" shape webbing attachment allows the pannier to be locked on the rack by creating an upward pull on a hook attached to the bottom of the rack correspondingly pulling the top "J" hooks down tightly onto the rack. This "V" shaped webbing attachment is made via mounting hardware that is screwed directly to the pannier's stiffener sheet to allow the most solid foundation, a pivot point for the adjustment system, and a replaceable component versus a sewn on part for easier field maintenance.

Accordingly, it is a principal object of this invention to provide for an improved pannier.

DETAILED DESCRIPTION OF THE DRAWINGS

Figure 1:
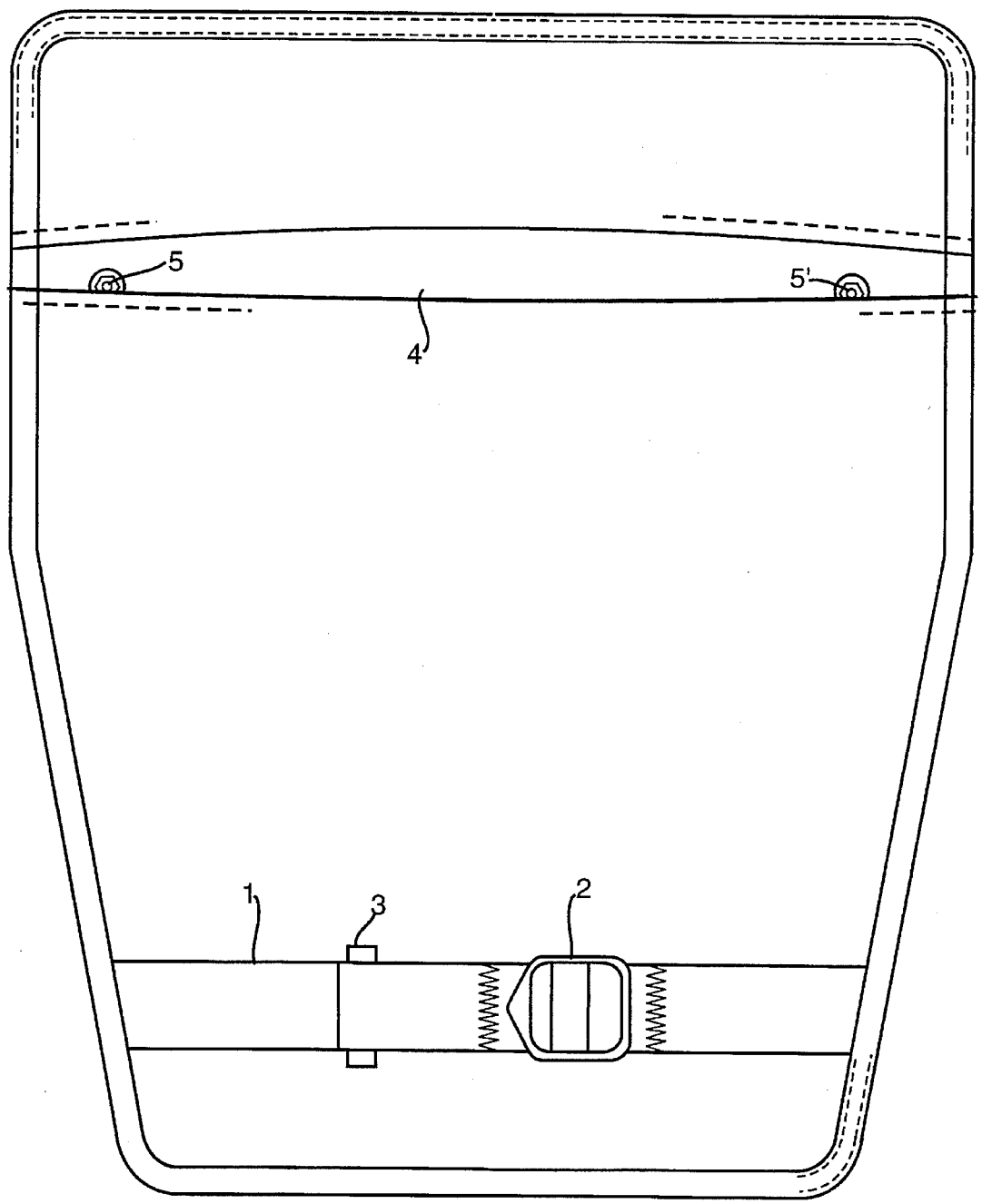
FIG. 1 is a view of the inside of the pannier.

FIG. 1 shows the interior mounting system of a pannier. Various configurations of bags may be attached to this system, irrespective of variations in the geometry of the stiffener sheet, the mounting system however will remain the same. The webbing strap 1 used to tighten the bottom mounting system is the foundation of the entire mounting set up. The strap is continuous, entering from the seams on the edge of the bag and being joined with a lockable friction buckle 2 (a National Molding tensionlock Buckle is preferred although many other locking type buckles are suitable) allowing the webbing track to be made extremely tight. The remainder of the webbing strap is attached to the main track with a clip type device 3 to keep the webbing from accidentally becoming caught on some of the bag's cargo. This is not an essential component to the system, but it is for the convenience of the user. The pannier stiffener 4 is most often formed from high density polyethylene, although various other sheet materials such as metal, other plastics or even wood could be substituted. The interior lock nuts on the pivot bolts 5 are used to direct and secure the attachment units 7 (FIG. 2) to the pannier stiffener sheet 4.

Figure 2:
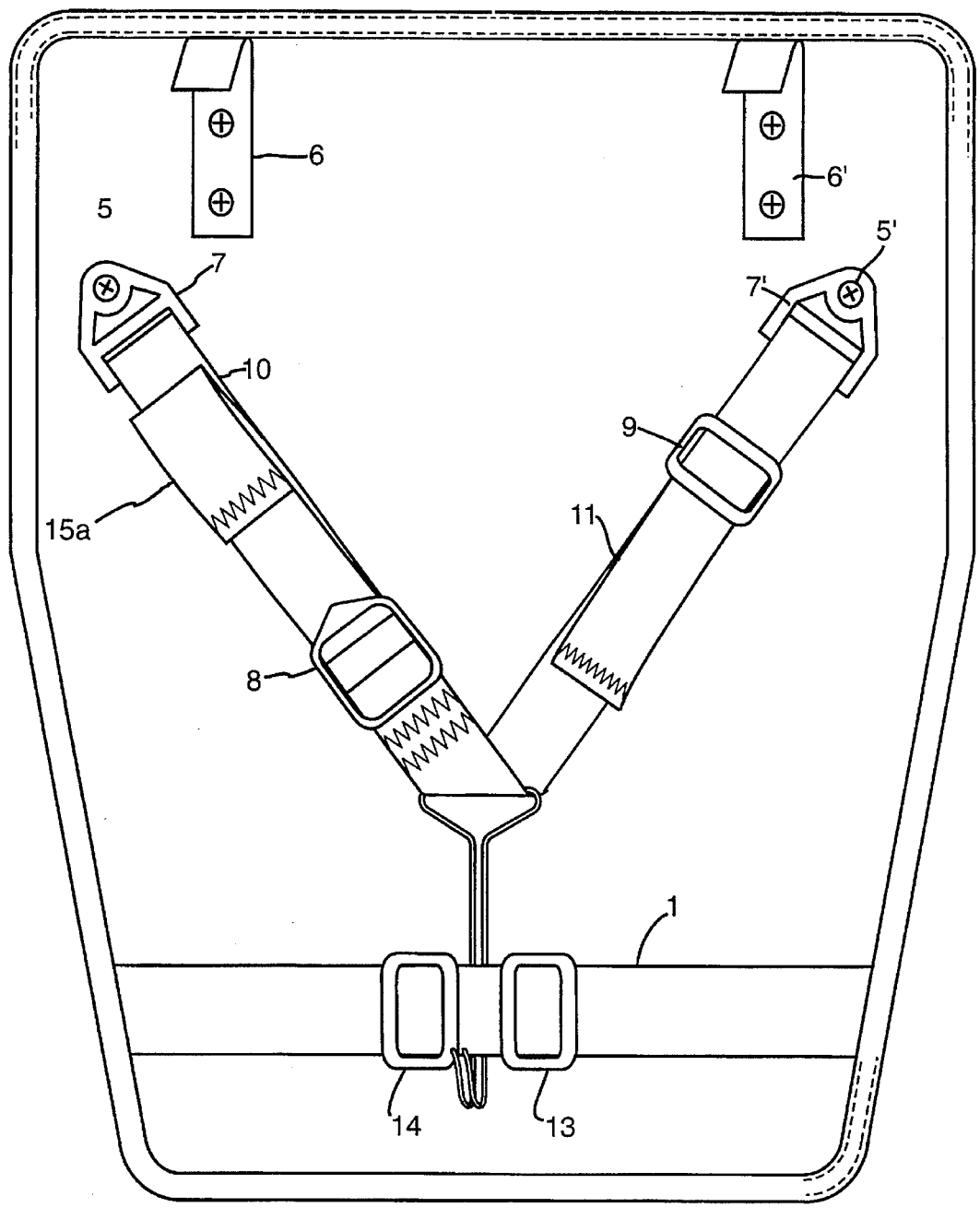
FIG. 2 is a view of the outside of the pannier.

The exterior of the bag is illustrated in FIG. 2. The "J" shaped hooks 6 and 6' that attach the bag to the rack are attached with two stainless steel screws and lockable nuts directly through the pannier frame sheet (other configurations known to the art are possible but the hooks must be extremely secure). The adjustable lock down system using the inverted "V" webbing configuration is secured at the pivot points via the bolts 5 passing through the pannier frame sheet allowing the plastic buckle 7 to rotate to the appropriate angle and secure the webbing 10 and 11. This end of the webbing 10 pass through a locking friction buckle 8 (a National Molding tensionlock is shown here) attached to the corresponding piece of webbing 11 that is locked to the pivot buckle 7' via a locking friction buckle 9 (here a National Molding sliplock is used) allowing the webbing 11 to be adjusted as needed. Once the rough adjustment is made on the webbing 11 the alternate side 10 is used to loosen or tighten the webbing moving the mounting hook 12 up or down. When the mounting hook 12 is secured to the bottom of the rack the webbing 10 is pulled tight through the friction buckle 8 and the remaining tail is attached back to itself with the use of hook and loop material at 15 to keep it from interfering with the spokes or gears.

The mounting hook 12 is secured behind the webbing track 1 and passes through a small piece of webbing joining the two friction buckles 13 and 14. When the webbing track 1 is loosened on the inside of the bag via the friction buckle 2 the exterior buckles 13 and 14 can then be moved by pushing one buckle and the pushing the other until the proper position is attained. With this buckle configuration it is impossible for the mounting hook 12 to move fore or aft on the webbing track 9 as the two buckles 13 and 14 are in constant tension with each other. Once the webbing track 1 is made taught by tightening the interior buckle 2, the system becomes entirely rigid and can not be moved at all.

Figure 3:
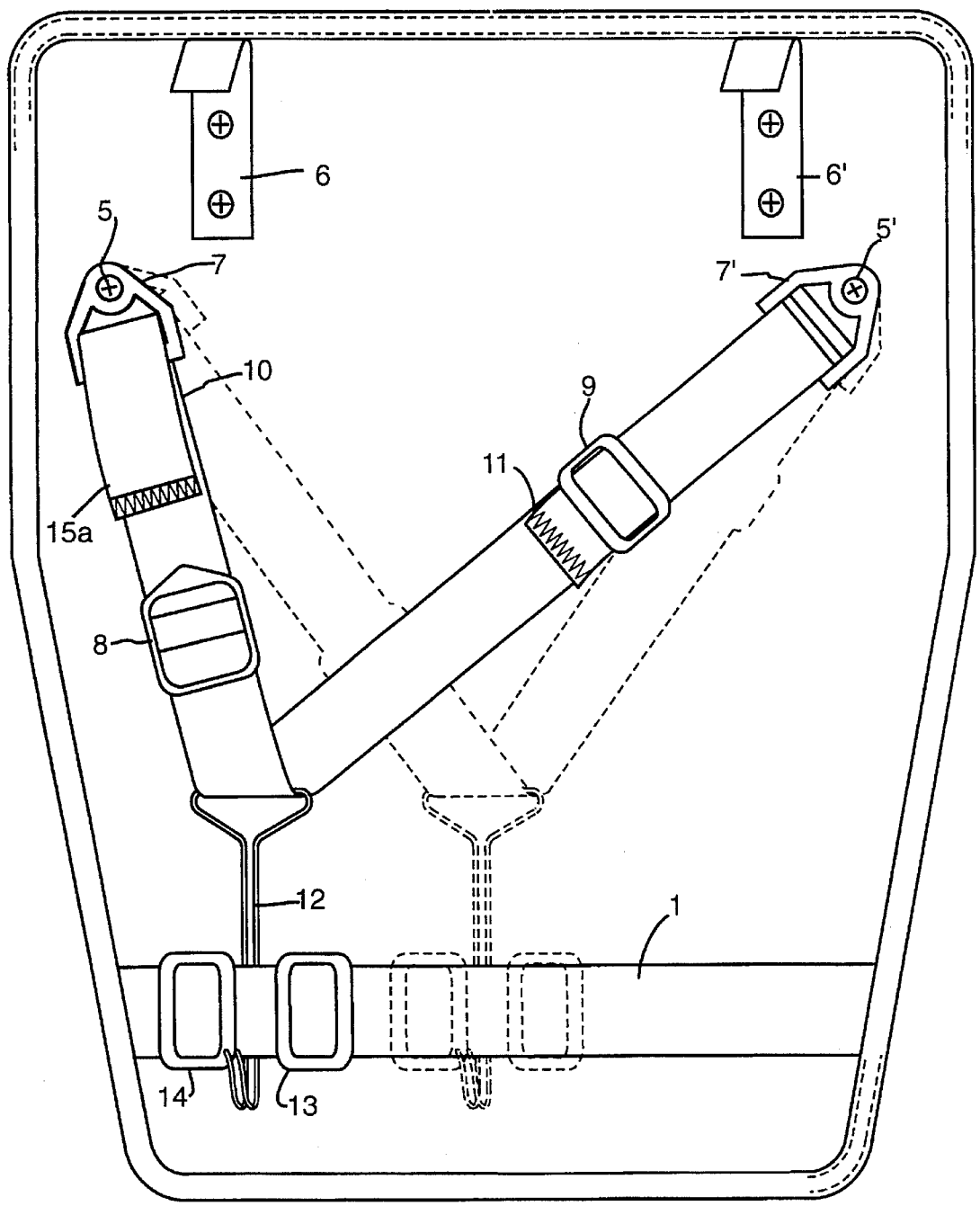
FIG. 3 shows an exterior view with the "V" belt.

FIG. 3 is the same view as FIG. 2 illustrating the movement capability of the system and the corresponding adjustments to the "V" shaped lock down system. The former position of webbing 11 is shown in phantom. By moving the mounting hook 12 forward, the pannier may be moved backward, and out of the way of the cyclist.

Though the invention has been described with respect to specific preferred embodiments, many variations and modifications will become apparent to those skilled in the art. It is therefore the intention that the appended claims be interpreted as broadly as possible in view of the prior art to include all such variations and modifications.

We claim:

1. A rack mounting attachment for cycle panniers which have a stiffener comprising:

at least two hooks, the hooks being adapted for attachment of the pannier to the rack mount, and being adapted for attachment to the stiffener of the pannier, two attachment units adapted for connection to the stiffener, a non-elastic, v-shaped member connected to each of the attachment units, a mounting hook connected to the non-elastic, v-shaped member, a horizontal track adapted to be connected, and disposed adjacent to the pannier, the mounting hook adapted to be disposed between the pannier and the horizontal track, and a horizontal positioning means connected to the horizontal track for constraining the mounting hook at a selected horizontal position along the horizontal track.

2. The rack mounting attachment of claim 1 wherein the hooks comprise inverted J-hooks.

3. The rack mounting attachment of claim 1 wherein at least one of the attachment units is adapted for pivotable rotation in a plane substantially parallel to a plane defined by the stiffener.

4. The rack mounting attachment of claim 3 wherein each of the attachment units is adapted for pivotable rotation in a plane substantially parallel to the plane defined by the stiffener.

5. The rack mounting attachment of claim 3 wherein the pivotable attachment units comprise a bolt adapted for attachment to the stiffener and a buckle adapted to be connected to the bolt for pivotable rotation relative to the bolt.

6. The rack mounting attachment of claim 1 wherein the non-elastic, v-shaped member comprises webbing.

7. The rack mounting attachment of claim 6 further including a buckle for adjusting the tension of the webbing.

8. The rack mounting attachment of claim 7 wherein the buckle for adjusting the tension of the webbing comprises a friction buckle.

9. The rack mounting attachment of claim 1 wherein the horizontal track comprises webbing.

10. The rack mounting attachment of claim 9 further including a clip to restrain the webbing.

11. The rack mounting attachment of claim 1 wherein the horizontal track is adapted to surround the stiffener.

12. The rack mounting attachment of claim 11 further includes a tensioning mechanism to tension the track.

13. The rack mounting attachment of claim 1 wherein the horizontal positioning means comprises at least one buckle attached to the horizontal track.

* * * * *